United States Patent
Li et al.

(10) Patent No.: US 12,507,909 B2
(45) Date of Patent: Dec. 30, 2025

(54) HANDHELD EXHALED GAS COLLECTION DEVICE

(71) Applicant: SHENZHEN BREATHA BIOTECHNOLOGY CO. LTD, Guangdong (CN)

(72) Inventors: Hang Li, Guangdong (CN); Dongjian Wang, Guangdong (CN)

(73) Assignee: SHENZHEN BREATHA BIOTECHNOLOGY CO. LTD, Guangdong (CN)

( * ) Notice: Subject to any disclaimer, the term of this patent is extended or adjusted under 35 U.S.C. 154(b) by 464 days.

(21) Appl. No.: 18/004,113

(22) PCT Filed: Oct. 15, 2020

(86) PCT No.: PCT/CN2020/121092
§ 371 (c)(1),
(2) Date: Jan. 3, 2023

(87) PCT Pub. No.: WO2022/000850
PCT Pub. Date: Jan. 6, 2022

(65) Prior Publication Data
US 2023/0293043 A1    Sep. 21, 2023

(30) Foreign Application Priority Data

Jul. 1, 2020  (CN) .......................... 202010621223.5
Jul. 1, 2020  (CN) .......................... 202021256628.5

(51) Int. Cl.
*A61B 5/097* (2006.01)
*B01D 53/26* (2006.01)

(52) U.S. Cl.
CPC ............ *A61B 5/097* (2013.01); *B01D 53/265* (2013.01); *B01D 2257/80* (2013.01); *B01D 2259/4533* (2013.01); *B01D 2259/4541* (2013.01)

(58) Field of Classification Search
None
See application file for complete search history.

(56) References Cited

U.S. PATENT DOCUMENTS

2024/0415408 A1*  12/2024  Paknahad .............. A61B 5/082

FOREIGN PATENT DOCUMENTS

| CN | 2167680 Y | 6/1994 |
|---|---|---|
| CN | 102498381 A | 6/2012 |

(Continued)

*Primary Examiner* — Jay B Shah
(74) *Attorney, Agent, or Firm* — NKL Law; Allen Xue

(57) ABSTRACT

A handheld exhaled gas collection device includes a gas access mechanism, a gas detection mechanism, a rotary valve and a gas collection mechanism connected in sequence, as well as sensors, a main processor and a blowback mechanism. The sensors are disposed on an outer side of the gas detection mechanism and are used to detect state parameters of an inhaled gas and transmit the collected data to the main processor. The blowback mechanism is used to inhale outside air and discharge same from the gas access mechanism by means of an exhaled gas path. The main processor can control the rotary valve to rotate, thereby changing the on-off state of the exhaled gas path. The gas access mechanism is used to filter water vapor in exhaled gas. The gas collection mechanism is used to externally connect a gas collection container so as to complete the collection of exhaled gas.

9 Claims, 11 Drawing Sheets

(56) References Cited

FOREIGN PATENT DOCUMENTS

| | | |
|---|---|---|
| CN | 103487479 A | 1/2014 |
| CN | 203465233 U | 3/2014 |
| CN | 204218935 U | 3/2015 |
| CN | 205228882 U | 5/2016 |
| CN | 205228892 U | 5/2016 |
| CN | 205483711 U | 8/2016 |
| CN | 206756525 U | 12/2017 |
| CN | 107961042 A | 4/2018 |
| CN | 207779768 U | 8/2018 |
| CN | 110226931 A | 9/2019 |
| CN | 209595789 U | 11/2019 |
| CN | 110596310 A | 12/2019 |
| CN | 111671472 A | 9/2020 |
| WO | 2019072947 A1 | 4/2019 |

\* cited by examiner

HANDHELD EXHALED GAS COLLECTION DEVICE

TECHNICAL FIELD

The present disclosure relates to the technical field of exhaled gas detection, especially to a handheld exhaled gas collection device.

BACKGROUND

From the perspective of human breathing, people inhale oxygen and exhale carbon dioxide, but neither is pure gas. People actually inhale air; depending on the individual situation, the gas exhaled by people contains water vapor and carbon dioxide, and most people's exhaled gas further includes nitrogen, oxygen, inert gas and other components. As a way to reflect the health state of the body, human breathing gas can reflect some important pathological symptoms, so that human exhaled gas can be used for various medical diagnosis techniques including exhaled gas analysis.

In the prior art, a device for collecting exhaled gas has a certain defects more or less. For example, "Alveolus Exhaled Gas Collection Device", disclosed with Publication No. CN207779768U, can blow gas into the gas bag and complete a large sample experiment through multiple blowing results, which cannot effectively distinguish "dead space gas" and "alveolar gas", and the practical application effect is poor; "Handheld Exhaled Gas Analyzer", disclosed with Publications No. CN 203465233U and CN103487479A, collects the subject's exhaled gas into the gas chamber and pumps the exhaled gas to the collection end through air pump, and a one-way valve is arranged to ensure a single trend of the exhaled gas; "Alveolus Exhaled Gas Collector", disclosed with Publication No. CN 204218935U, uses the same idea, which ensures that the collected alveolar gas does not return through the control of the one-way valve by opening the switch after storing a part of the exhaled gas; "End-Expiratory Sampling Device", disclosed with Publication No. CN205228892U, adopts the same idea, but it ensures the quantitative collection of collected gas through the cooperation of two-way valve I and two-way valve II, although this patent can normally collect the alveolar gas after filtering the dead space gas through the action of the sensor, after the alveolar air of the first subject is collected, due to the inevitable gas residue in the gas chamber or pipeline, the collected data of the next subject may be affected, the respiratory gas of all subjects cannot be effectively analyzed, and the subsequent analysis result is not accurate enough.

"Gas Sampling Device for Detecting VOC in Exhaled Gas", disclosed with Publication No. CN 206756525U, discloses its use method in the specification. Before sampling is started, the blowing nozzle repeatedly fills nitrogen into the gas collecting system for several times to avoid residual gas pollution. However, nitrogen gas supply device generally has a large specification and is only used in hospitals, which is not conducive to the development of miniaturization, family and mobility of sampling device, and at the same time, nitrogen purging needs to control the flow rate of nitrogen, and the procedure is relatively complex.

"Exhaled Gas Analysis Device and Use Method", disclosed with Publication No. CN 110226931A, almost well avoids the above defects, but because the device is controlled by a plurality of valves including "three-way valve", "first valve", "second valve" and the like, the solenoid valve with large-diameter is large in calorific value, large in overall weight, inconvenient to carry, not light in weight and miniaturized, and at the same time, the large number of valves also means that the gas residue of a subject in the valve body is large, which also leads to inaccurate data collection of the next subject.

SUMMARY OF THE INVENTION

According to the technical problems mentioned above, a handheld exhaled gas collection device is provided. The present invention mainly uses the embedded rotary valve to effectively reduce the overall weight of the device, and rapidly liquefy the water vapor exhaled by the subject through the semiconductor chilling plate so as to effectively remove the water vapor in the exhaled gas. The present invention adopts the technical solutions as follows:

A handheld exhaled gas collection device includes a gas access mechanism, a gas detection mechanism, a rotary valve and a gas collection mechanism connected in sequence, among which an exhaled gas path can be formed, and the device further includes sensors, a main processor and a blowback mechanism. The sensors are arranged on an outside of the gas detection mechanism for detecting status parameters of the exhaled gas and transmitting collected data to the main processor. The blowback mechanism is configured to inhale external air and discharge it from the gas access mechanism through the exhaled gas path. The main processor can control the rotary valve to rotate based on the status parameters of the exhaled gas, so as to change the on-off state of the exhaled gas path. The gas access mechanism is configured to filter water vapor in the exhaled gas, and the gas collection mechanism is configured to externally connect a gas collection container to collect the exhaled gas.

Further, the water vapor is filtered by liquefying the water vapor. Specifically, the gas access mechanism includes a mouthpiece connection portion, a condensation portion and a gas detection mechanism connection portion. The mouthpiece connection portion is configured to connect an external mouthpiece. An outside of the condensation portion is attached with a semiconductor chilling plate for refrigeration. The semiconductor chilling plate is electrically connected with the main processor. The gas detection mechanism can be sleeved on the gas detection mechanism connection portion, and the gas access mechanism is made of quartz material.

Further, both sides of an outside of the condensation portion are provided with semiconductor chilling plates, as well as thermistors for measuring a temperature of the condensation portion in real time, and heat sinks and cooling fans for heat dissipation of the semiconductor chilling plates. One side of the semiconductor chilling plate is a refrigeration end and the other side is a heat dissipation end. The refrigeration end of the semiconductor chilling plate is attached to the quartz body, and the heat dissipation end of the semiconductor chilling plate is attached to a heat transfer end of the heat sink through thermally conductive silica gel. The cooling fan is disposed at a heat dissipation end of the heat sink, and the rotational speed of the cooling fan can be adjusted under the control of the main processor.

Further, the sensor includes $CO_2$ sensor and/or flow sensor.

Further, the rotary valve includes a rigid main body portion and a value body rotatable in the main body portion. The main body portion is provided with a longitudinal gas path and a transverse blowback gas path, and the blowback gas path is in communication with the longitudinal gas path. A bottom of the longitudinal gas path is the gas collection mechanism. The valve body includes a first steering valve. The gas collection mechanism includes a connector connected with the gas collection container. The first steering valve is disposed between the upper longitudinal gas path and the blowback gas path, one end of the first steering valve is connected to a first motor, and the other end is provided with a positioning hole passing through the main body portion.

Further, the rotary valve includes a rigid main body portion and a valve body rotatable in the main body portion. The main body portion is provided with a longitudinal gas path and a transverse blowback gas path, and the blowback gas path is in communication with the longitudinal gas path. A bottom of the longitudinal gas path is the gas collection mechanism. The valve body includes a first steering valve and a second steering valve. The first steering valve is disposed between the upper longitudinal gas path and the blowback gas path, and the second steering valve is disposed between the blowback gas path and the lower longitudinal gas path. One end of the first steering valve is connected to a first motor and the other end is provided with a positioning hole passing through the main body portion. One end of the second steering valve is connected to a second motor and the other end is provided with a positioning hole passing through the main body, and a main body of the second steering valve is shaped as a cylinder.

Further, the first steering valve is shaped as a cylinder longitudinally cut by at least one plane. The device further includes a detection mechanism. The main body portion is provided with a groove to accommodate the detection mechanism, and the detection mechanism is configured to emit light under the control of the main processor and identify a rotation state of the steering valve based on a state of the light penetrating the positioning hole. The positioning hole of the first steering valve includes a first positioning through hole penetrating through its cutting surface and having a certain distance from a gas passage of the first steering valve.

Further, a motor support frame is disposed the outside the valve body, and is fixedly connected with the main body portion. An outer diameter of a rotating shaft matches an inner diameter of a slotted hole of the plastic valve body, and the material of the rotary valve body is the same as or different from that of the main body portion.

Further, the blowback mechanism includes a micro air pump. A gas outlet of the micro air pump is connected with the blowback gas path, and a filter is further arranged therebetween for purifying air. Further, the exhaled gas path, the rotary valve, the sensors, the main processor and the blowback mechanism are packaged in a main housing. The main housing includes a first housing and a second housing. The second housing is detachably connected to the first housing. The back of the first housing is provided with a groove to accommodate the filter, and the filter is connected to an output pipe section of the micro air pump through upper and lower connectors. The first housing is internally provided with a main support frame, a main body part of the main support frame is configured to carry a circuit board, and the front of the main support frame is configured to carry a display screen. The back of the first housing is further provided with a through hole for connecting an external data line. The first housing is internally provided with a rechargeable battery, and is also provided with a charging port corresponding to the position of the rechargeable battery.

According to the present invention, the gas resistance of the gas passage is very small, so that the comfort level of the subject during expiratory process is ensured. Through the cooperation of the sensor, the main processor and the rotary valve, the collection path can be automatically switched, so as to effectively collect the subject's alveolar gas. The water vapor exhaled by the subject is rapidly liquefied through the semiconductor chilling plate, so as to effectively remove water vapor in the exhalation, reducing the excess components of the collected gas. The gas in the gas path is quickly cleaned by means of the blowback mechanism, so as to prevent confusion of the next subject's exhalation. The present invention has a light overall weight, is sufficiently miniaturized and modularized, and is suitable for widespread popularization in the field of exhaled gas detection technology.

DETAILED DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the art may still derive other accompanying drawings from these accompanying drawings without creative efforts.

In the figures: 101. mouthpiece connection portion; 102. condensation portion; 103. gas detection mechanism connection portion; 104. mouthpiece; 105. semiconductor chilling plate; 106. cooling fan; 107. thermistor; 108. heat sink; 109. quartz connection tube; 110. refrigeration module control board; 111. refrigeration module connection joint; 201. $CO_2$ sensor; 202. Flow/flow rate sensor; 203. connection corner joint; 204. sensor connection joint; 3. rotary valve;

301. optocoupler switch; 302. first steering valve; 303. main body portion; 304. first motor; 305. motor support frame; 306. assembly nut; 307. second steering valve; 308. second motor; 401. sampler joint; 402 collection container joint; 501. micro air pump; 502. blowback mechanism filter; 503. gas pipe connection joint; 601. first housing; 602. second housing.

DETAILED DESCRIPTION OF PREFERRED EMBODIMENTS

In order to make the purpose, technical solution and advantages of the embodiment of the present invention clearer, the following clearly and completely describes the technical solutions in the embodiments of the present invention in combination with the accompanying drawings in the embodiments of the present invention. Apparently, the described embodiments are merely some rather than all of the embodiments. Based on the embodiments of the present invention, all the other embodiments obtained by those of ordinary skill in the art without inventive effort are within the protection scope of the present invention.

Figure 1:
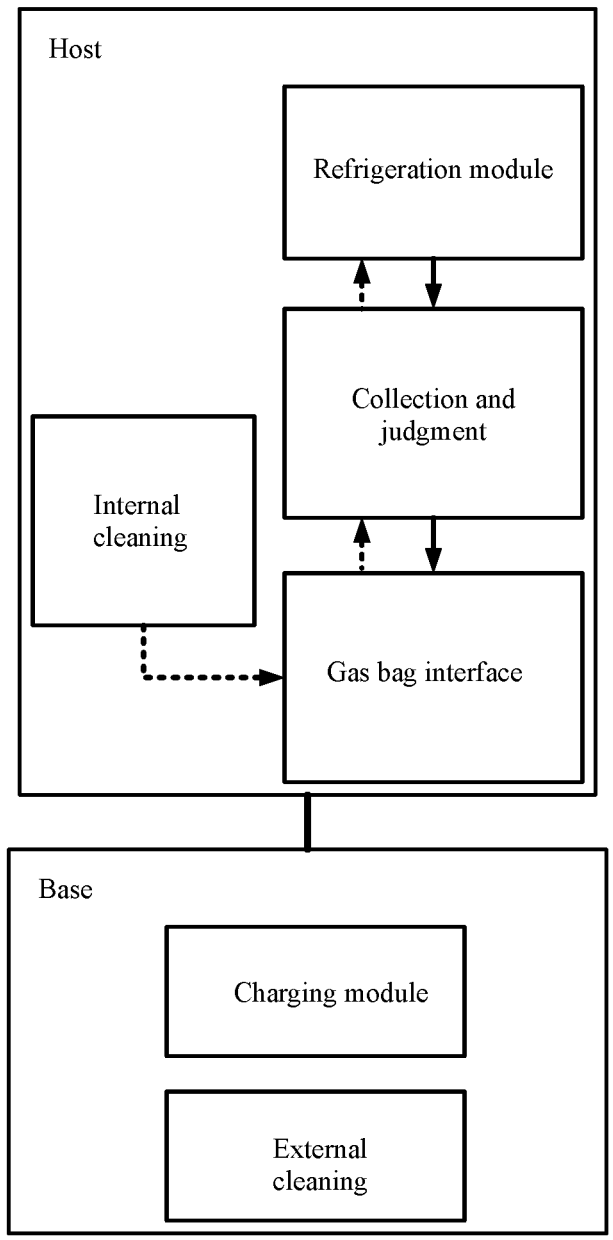
FIG. 1 is block diagram of an overall structure of the present invention.
Figure 2:
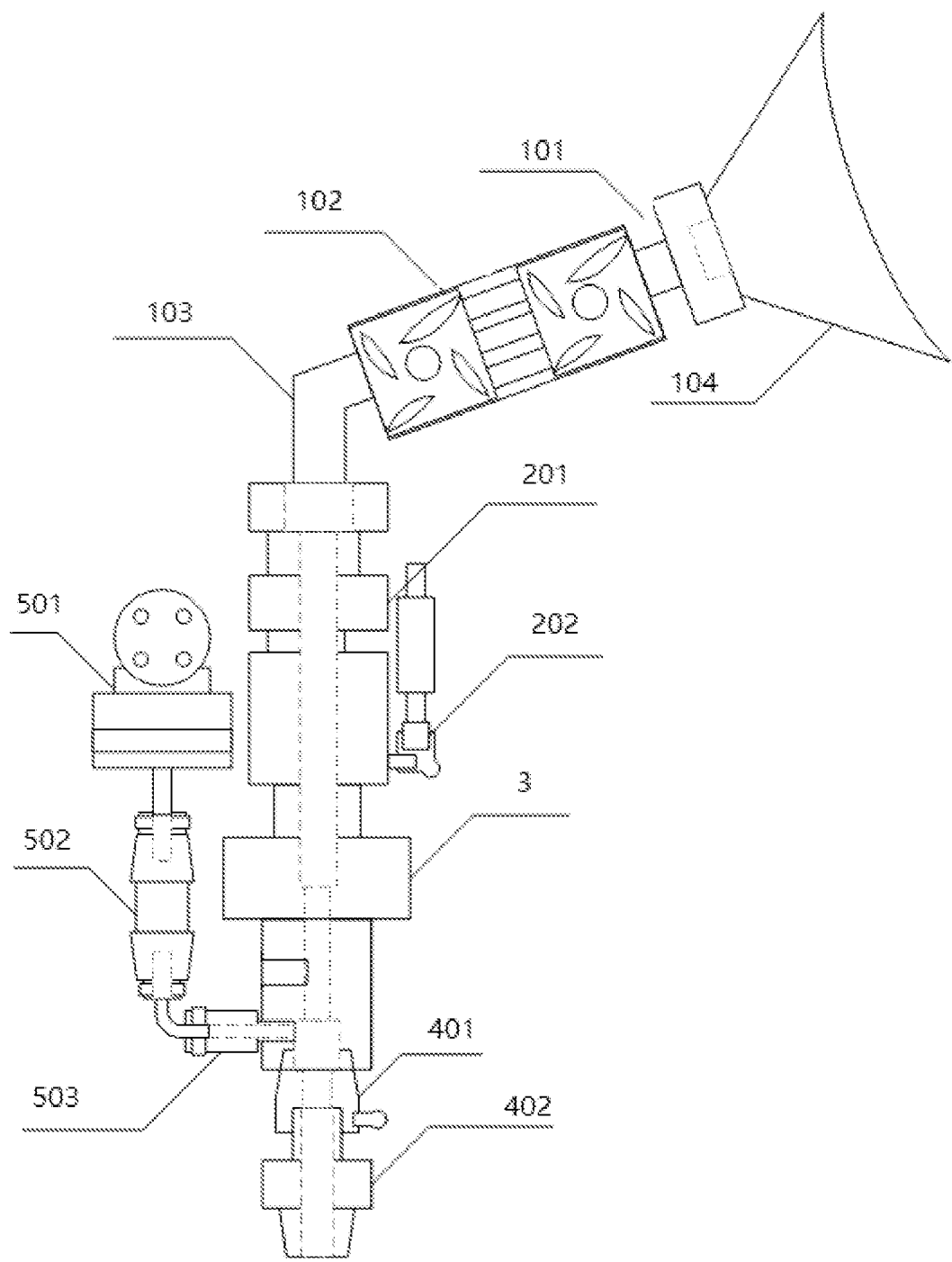
FIG. 2 is a schematic diagram of a host according to an embodiment of the present invention.
Figure 3:
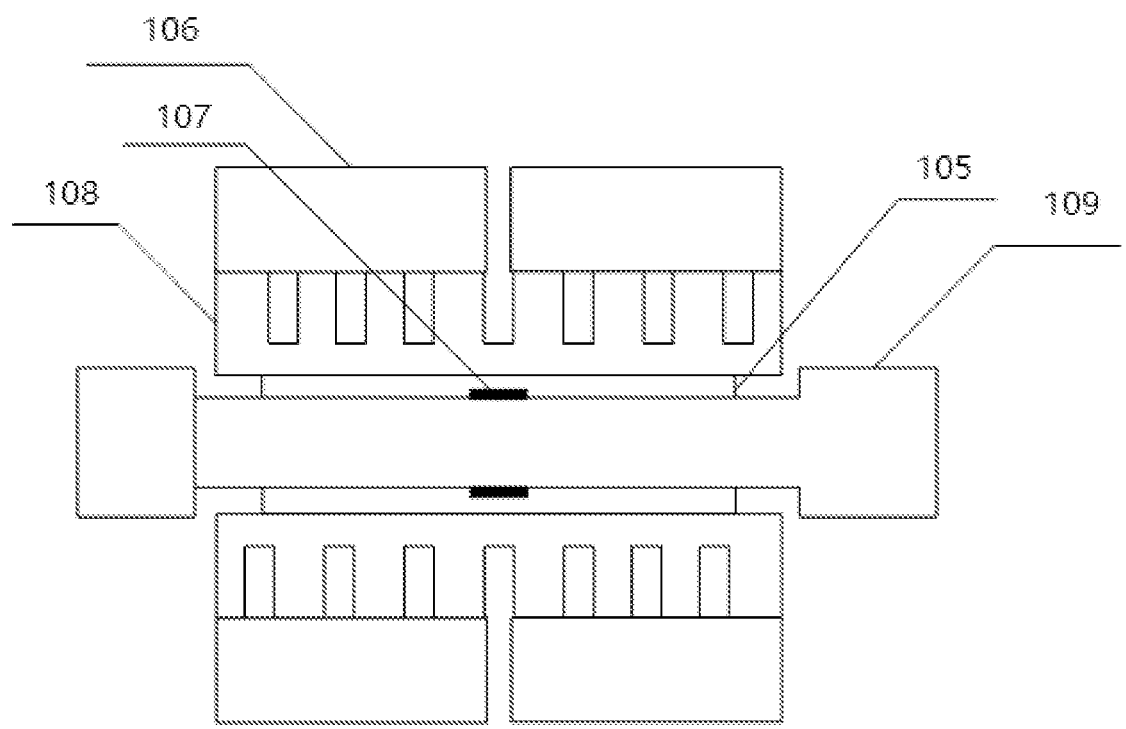
FIG. 3 is a structural schematic diagram of the gas access mechanism according to an embodiment of the present invention.
Figure 4:
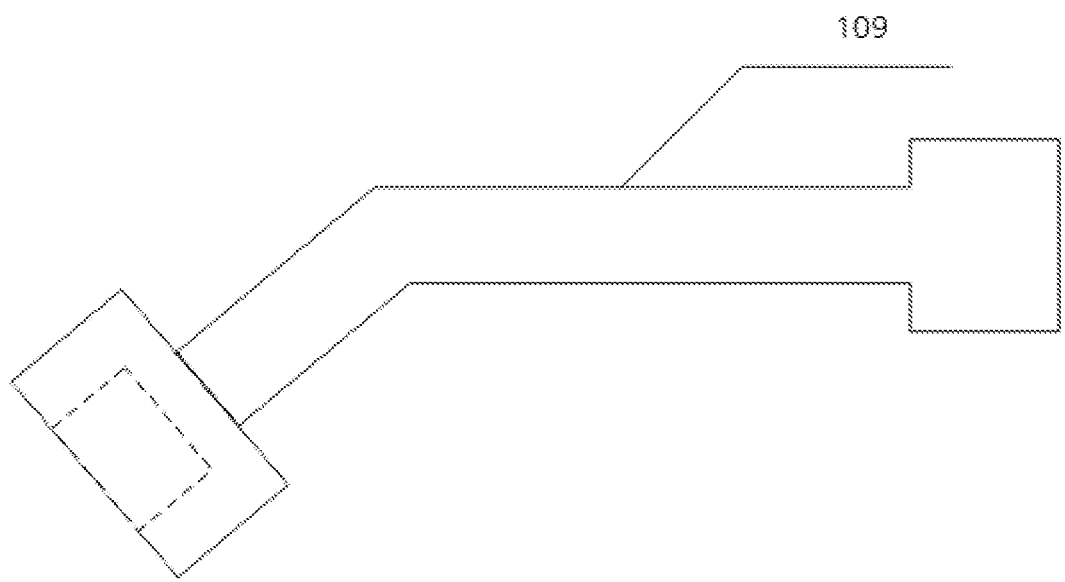
FIG. 4 is a schematic diagram of a front view of the condensation portion according to an embodiment of the present invention.

In Embodiment 1, as shown in FIG. 1 and FIG. 2, a handheld exhaled gas collection device is disclosed. The exhaled gas collection device includes a gas access mechanism, a gas detection mechanism, a rotary valve 3 and a gas collection mechanism connected in sequence, among which an exhaled gas path can be formed; and the device further includes sensors, a main processor and a blowback mechanism. The sensors are arranged on the outside of the gas detection mechanism for detecting status parameters of the exhaled gas and transmitting collected data to the main processor. The blowback mechanism is configured to inhale external air and discharge it from the gas access mechanism through the exhaled gas path. The main processor can control the rotation of the rotary valve based on the status parameters of the exhaled gas, so as to change the on-off state of the exhaled gas path. The gas access mechanism is configured to filter water vapor in the exhaled gas. The gas collection mechanism is configured to externally connect a gas collection container so as to collect the exhaled gas. In the embodiment, the gas collection container may be a gas collection bag. As shown in FIG. 3 and FIG. 4, the gas access mechanism includes a mouthpiece connection portion, a condensation portion and a gas detection mechanism connection portion connected in turn. The mouthpiece connection portion 101 is configured to connect an external mouthpiece 104. In the embodiment, in order to reduce the gas resistance, the inner diameter of the mouthpiece connection portion 101 matches the outer diameter of the mouthpiece, so that the mouthpiece can be effectively caught to the mouthpiece connection portion while the airflow is maintained. The condensation portion 102 is externally attached with a semiconductor chilling plate 105. The gas detection mechanism can be sleeved on the gas detection mechanism connection portion 103. As a preferred implementation method, there is a preset bending angle at the rear section of the condensation portion 102, so that the rear section of the condensation portion, the gas detection mechanism connection portion, the gas detection mechanism and the gas collection mechanism are on the same straight line, facilitating the subject to grasp; the front section of the condensation portion, the mouthpiece connection portion and the mouthpiece are on the same straight line, and the preset bending angle is an obtuse angle to facilitate the subject to exhale smoothly while grasping. As a preferred implementation method, the gas access mechanism is a connection tube 109 made of quartz material. In order to facilitate processing and attachment of semiconductor chilling plate, the overall cross section of the condensation portion is polygonal, and may further be a regular polygon with the same cross-sectional area. In this embodiment, the semiconductor chilling plates are in two groups and symmetrically attached to both sides of the condensation portion.

Figure 5:
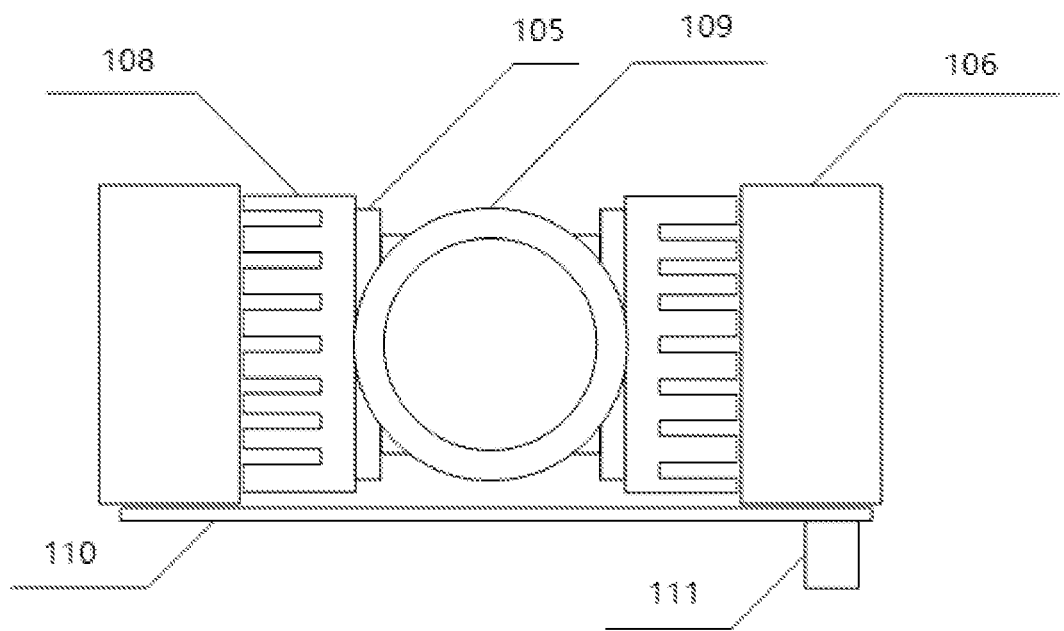
FIG. 5 is a structural schematic diagram of a side view of the condensation portion according to an embodiment of the present invention.

As shown in FIG. 5, in addition to the semiconductor chilling plates, the two sides of the condensation portion further include thermistors 107 for measuring the temperature of the condensation portion 102 in real time, heat sinks 108 and cooling fans 106 for heat dissipation of the semiconductor chilling plates. In this embodiment, the thermistor is composed of a high-precision thermistor with a precision of 1% and is wrapped with an insulating material; one side of the semiconductor chilling plate is a refrigeration end and the other side is a heat dissipation end, the refrigeration end of the semiconductor chilling plate is attached to the quartz body, and the heat dissipation end of the semiconductor chilling plate is attached to a heat transfer end of the heat sink through thermally conductive silica gel; the cooling fan is disposed at a heat dissipation end of the heat sink; the cooling fan has a speed adjustment function, and under the control of the main processor, the greater the rotation speed of the fan, the more obvious the heat dissipation effect; the heat dissipation end of the heat sink is a grid-shaped metal sawtooth. The temperature control system of the overall semiconductor chilling plate is a closed-loop feedback network composed of a thermistor and a semiconductor chilling plate, and the refrigeration module control board 110 controls the device through a PID algorithm, which is connected to the main processor through the refrigeration module connection joint 111. The temperature control precision may reach 0.01° C. In this embodiment, the cooling fan may select a 5V direct-current cooling fan; the fan is provided with a threaded hole, and the fans, semiconductor chilling plates and other mechanisms on both sides are fixed to two sides of the condensation portion by tightening the bolts.

By adjusting the refrigeration temperature of the semiconductor chilling plate to the dew point temperature of the water vapor under this atmospheric pressure, the water vapor exhaled by the subject can be quickly liquefied at the front end of the condensation portion, thereby effectively removing the water vapor in the exhalation. According to specific experimental requirements, the preset percentage of water vapor dehumidification is different, and the refrigeration temperature is also different. In this embodiment, the refrigeration temperature is controlled to be 10° C. to –10° C., and the preset percentage of water vapor dehumidification is 50% to 80%, or higher.

After the subject collects alveolar gas ad before the next subject collects exhalation, in order to quickly vaporize the condensed liquid water, a heating device is also arranged on the condensation portion as a preferred implementation method. In this embodiment, the number of each group of semiconductor chilling plates is 2 in reverse setting, that is, the refrigeration end of one of the semiconductor chilling plates is attached to the quartz body, and the heat dissipation end of the other semiconductor chilling plate is attached to the quartz body. When the voltage is positive, one of the semiconductor chilling plates refrigerates, and when the voltage is reverse, one semiconductor chilling plate heats. Alternatively, grooves for accommodating the heating plate are machined on both sides of the quartz body of the condensation portion. The main processor controls the heating plates to heat, although the vaporization effect of the water vapor can be better, there are also shortcomings that the service life of the semiconductor chilling plate is affected, and an appropriate heating mode can be selected according to actual conditions.

Figure 6:
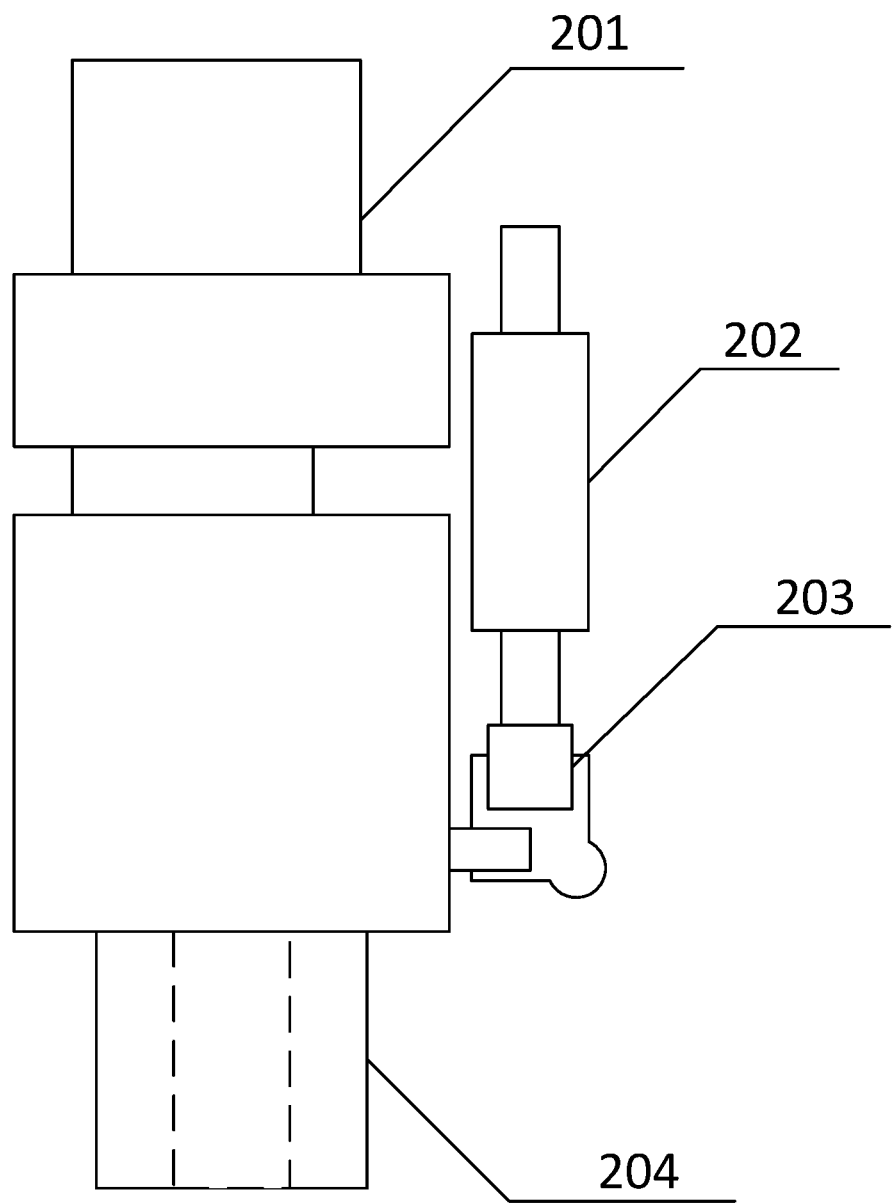
FIG. 6 is a structural schematic diagram of the gas detection mechanism according to an embodiment of the present invention.

As shown in FIG. 6, the sensors include a $CO_2$ sensor 201 and/or a flow sensor 202, which are respectively fixed on the main body support portion of the gas detection mechanism through the connection corner joint 203 and the sensor connection joint 204. In this embodiment, the $CO_2$ sensor adopts the principle of non-dispersive infrared, wherein the models can be C500 and C600. In this embodiment, the flow sensor can select a gas pressure sensor, such as MPXV7002DP. In order to facilitate the monitoring of the sensor, the gas detection mechanism is made of transparent material, which may be specifically made of a plastic material; the exhaled water vapor will produce gas when encountering the plastic layer, so that the liquefied water vapor also enhances the detection precision of the sensor. In order to further enhance the detection precision, the contact side of the gas detection mechanism and the sensor probe is configured as an optical window structure, that is, a spherical/cambered surface from inside to outside, or a convex lens surface with a thick center and a thin edge adjusted according to a preset ratio, which has a higher transparency. In this embodiment, the pipe diameter of the gas path is 4 mm, which may be adjusted within a certain range in other embodiments. In order to enhance the stability of the structure, the upper and lower sides of the optical window are fixedly connected with plastic stiffeners which are square frame shape or semi-enclosed square frame shape or other stable structures, and one side of the plastic stiffener is fixed on the main housing of the device or other stabilizing mechanisms.

Figure 7:
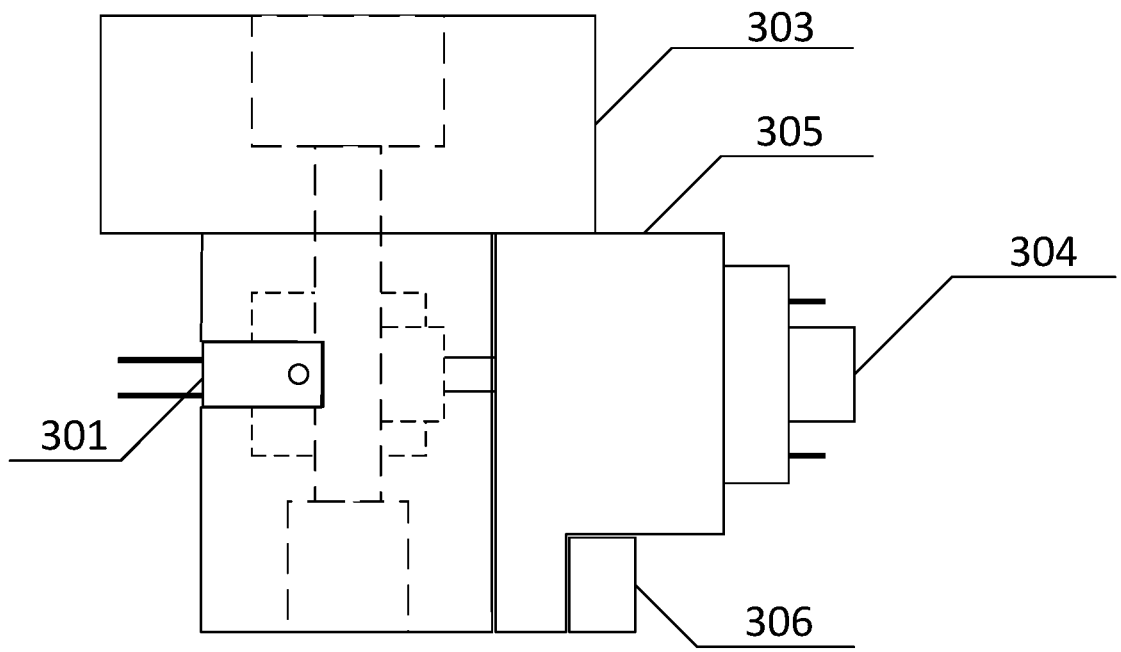
FIG. 7 is a schematic diagram of an overall structure of the rotary valve according to Embodiment 1 of the present invention.
Figure 8:
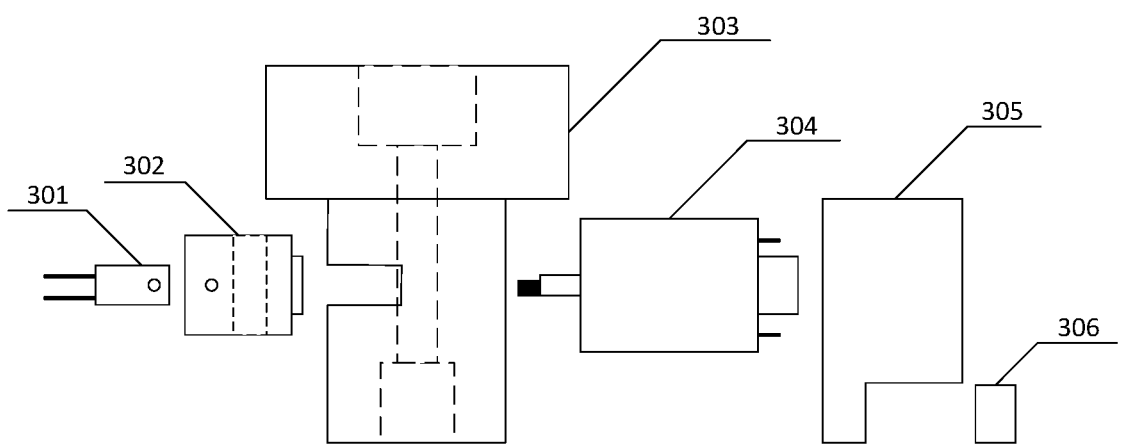
FIG. 8 is an exploded view of the rotary valve according to Embodiment 1 of the present invention.

As shown in FIG. 7 and FIG. 8, the rotary valve is one of the main innovations of the present invention. According to different use conditions, the rotary valve may be divided into two achievable structural forms, wherein one form of the rotary valve includes a rigid main body portion 303 and a valve body rotatable in the main body portion. The main body portion is provided with a longitudinal gas path and a transverse blowback gas path; the transverse blowback gas path is in communication with the longitudinal gas path, the bottom of the longitudinal gas path is the gas collection mechanism. The valve body includes a first steering valve 302. The gas collection mechanism includes a sampler joint 401, and further includes a collection container joint 402 detachably connected to the gas collection mechanism. After the sampler joint 401 and the collection container joint 402 are connected to the gas collection mechanism, respiratory gas collection can be carried out. The first steering valve is disposed between the upper longitudinal gas path and the blowback gas path. One end of the first steering valve is connected to the first motor 304, and the other end is provided with a positioning hole passing through the main body portion.

In Embodiment 2, another form of the rotary valve includes a rigid main body portion and a value body rotatable in the main body portion. The main body portion is provided with a longitudinal gas path and a transverse blowback gas path; the transverse blowback gas path is in communication with the longitudinal gas path. The bottom of the longitudinal gas path is the gas collection mechanism, and the gas collection mechanism is connected to the detachable sampling bag, so as to facilitate the subsequent analysis of the sampling gas in the sampling bag. The valve body includes a first steering valve and a second steering valve, wherein the first steering valve is disposed between the upper longitudinal gas path and the blowback gas path, the second steering valve is disposed between the blowback gas path and the lower longitudinal gas path. One end of the first steering valve is connected to a first motor and the other end of the first steering valve is provided with a positioning hole passing through the main body portion. One end of the second steering valve is connected to a second motor and the other end of the second steering valve is provided with a positioning hole passing through the main body portion. In order to facilitate fine adjustment of the rotation angle of the rotary valve body, the gear reduction motor is selected in this embodiment, and the specific reduction ratio may be selected according to actual situations. For example, two models of 1:380 and 1:1000 are selected in this embodiment.

The above-mentioned first steering valve is shaped as a cylinder longitudinally cut by at least one plane and the main body shape of the above second steering valve is a cylinder. The device further includes a detection mechanism. The main body portion is provided with a groove to accommodate the detection mechanism, and the detection mechanism is configured to emit light under the control of the main processor and identify a rotation state of the steering valve based on a state of the light penetrating the positioning hole. The positioning hole of the first steering valve includes a first positioning through hole penetrating through its cutting surface and having a certain distance from a gas passage of the first steering valve. In this embodiment, the detection mechanism selects an optocoupler switch. In an alternative embodiment, there are one or two cutting planes; if there are two cutting planes, the two cutting planes are symmetrically arranged about the longitudinal section of the cylinder passing through the center of a circle, that is, a long circle. If the first steering valve is cut by two planes, the positioning hole may be one, if the first steering valve is cut by one plane, there are at least two positioning holes, and the second positioning hole and the first positioning hole are on the same plane and have a preset angle. In other alternative embodiments, there may be more positioning holes for more accurate positioning, such as the third positioning hole. The third positioning hole is perpendicular to the first position hole, and the distances between the second positioning hole and the first and the second positioning holes are different, that is, the second positioning hole is disposed on one side close to the cutting surface or on the cylindrical body close to the non-cutting surface.

A motor support frame 305 is disposed outside the valve body and the motor, and is fixedly connected with the main body portion through an assembly nut 306. An outer diameter of a rotating shaft matches an inner diameter of a slotted hole of the plastic valve body. The material of the rotary valve body is the same or different from that of the main body portion. If the material of the rotary valve body is different from that of the main body portion, the main body portion may be made of pk material (polyketone) as a support stator, the rotary valve body is made of plastic material as a rotor, a metal rotating shaft is embedded in one side, connected to the motor, of the main body portion, and the outer diameter of the rotating shaft matches the inner diameter of a slotted hole of the plastic valve body. In this embodiment, the rotor is made of copper. The rotating shaft made of metal may effectively prevent the lubricating oil of the motor from flowing into the gas path while ensuring sufficient rigidity. If the material of the rotary valve body is the same as that of the main body portion, other feasible materials including ceramic may be selected.

Figure 9:
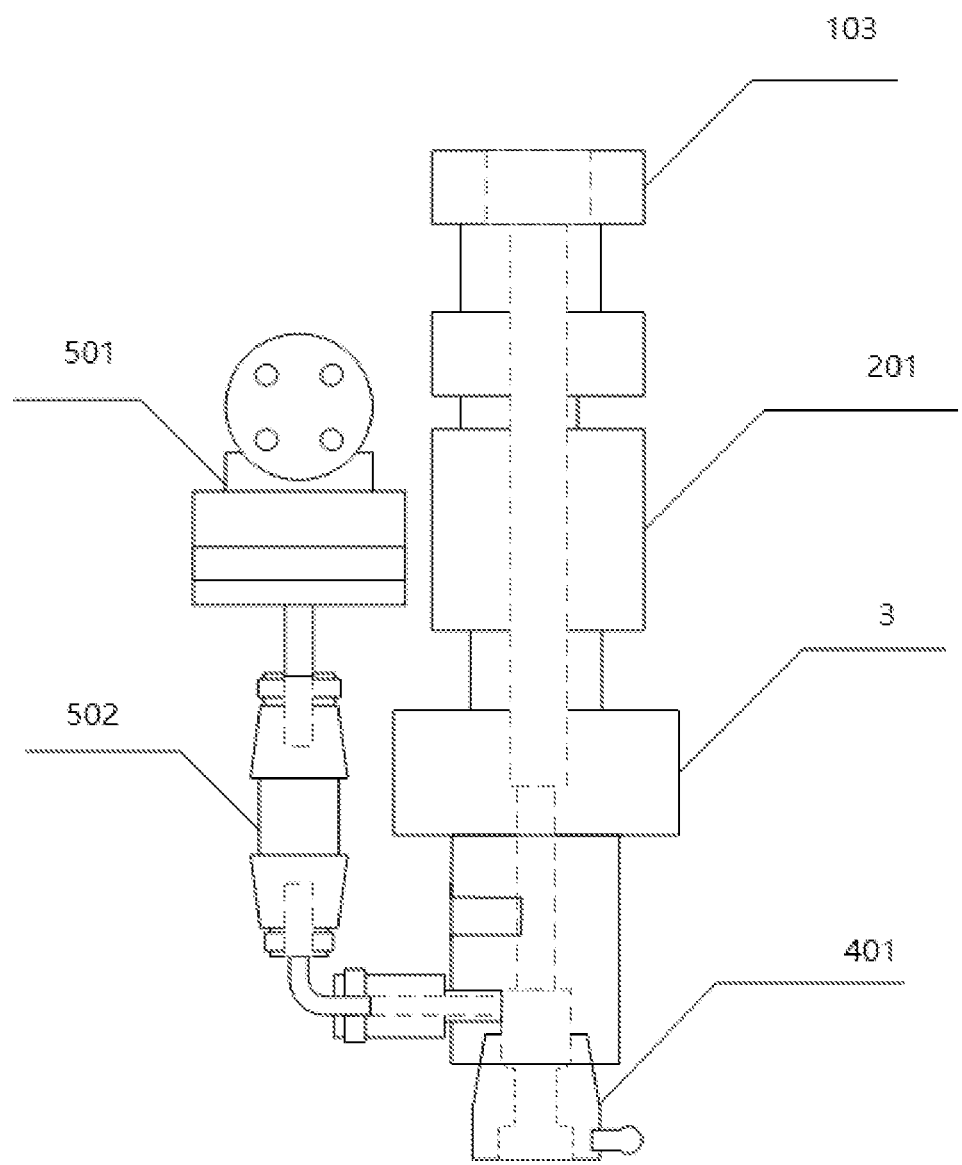
FIG. 9 is a schematic diagram of the blowback structure according to an embodiment of the present invention.

As shown in FIG. 9, the blowback mechanism includes a micro air pump 501, and the gas outlet of the micro air pump is connected with the blowback gas path through the gas pipe connecting joint 503, and a blowback mechanism filter 502 is further arranged therebetween for purifying air.

Figure 10:
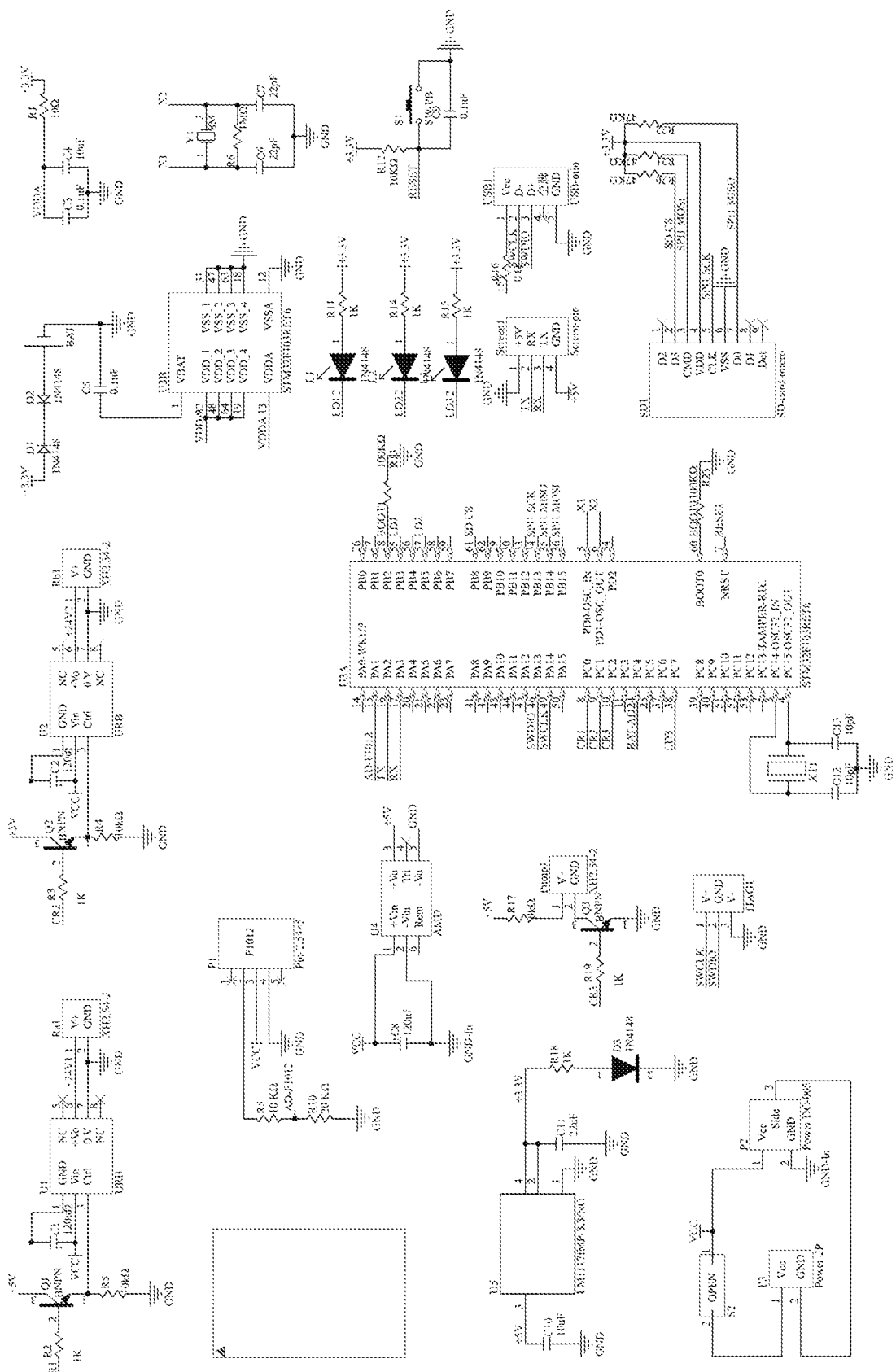
FIG. 10 is a circuit diagram of the present invention.
Figure 11:
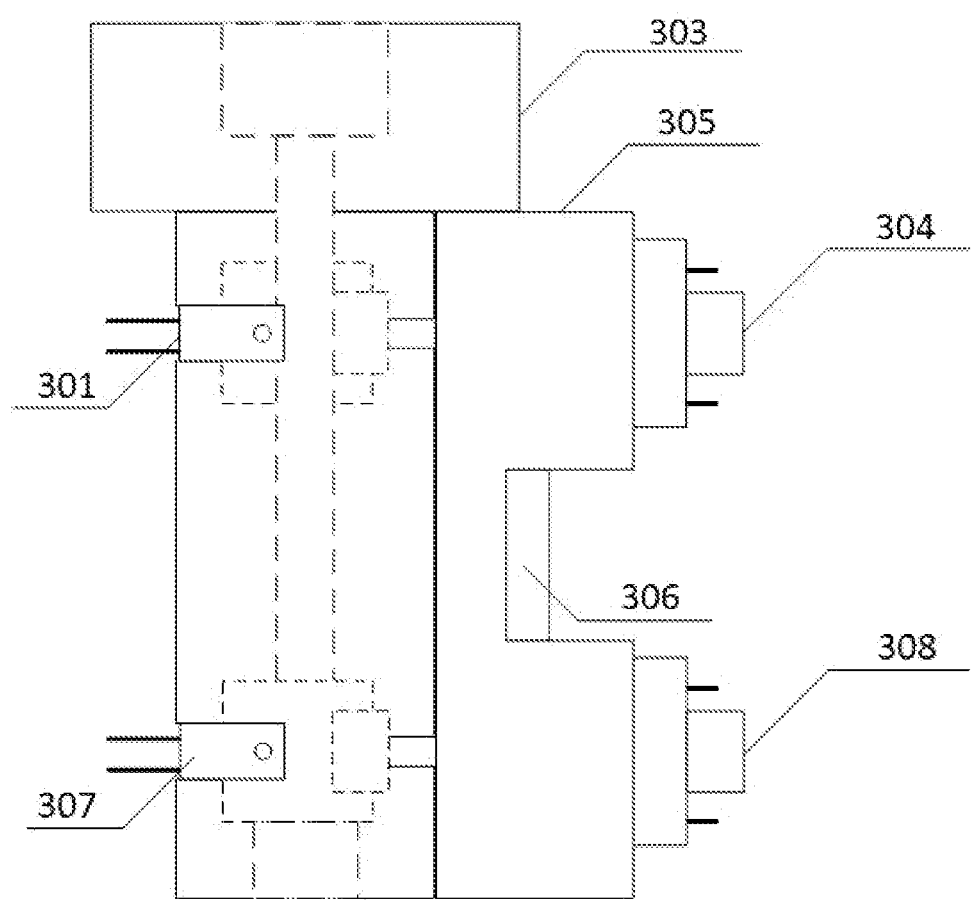
FIG. 11 is a schematic diagram of an overall structure of the rotary valve according to Embodiment 2 of the present invention.
Figure 12:
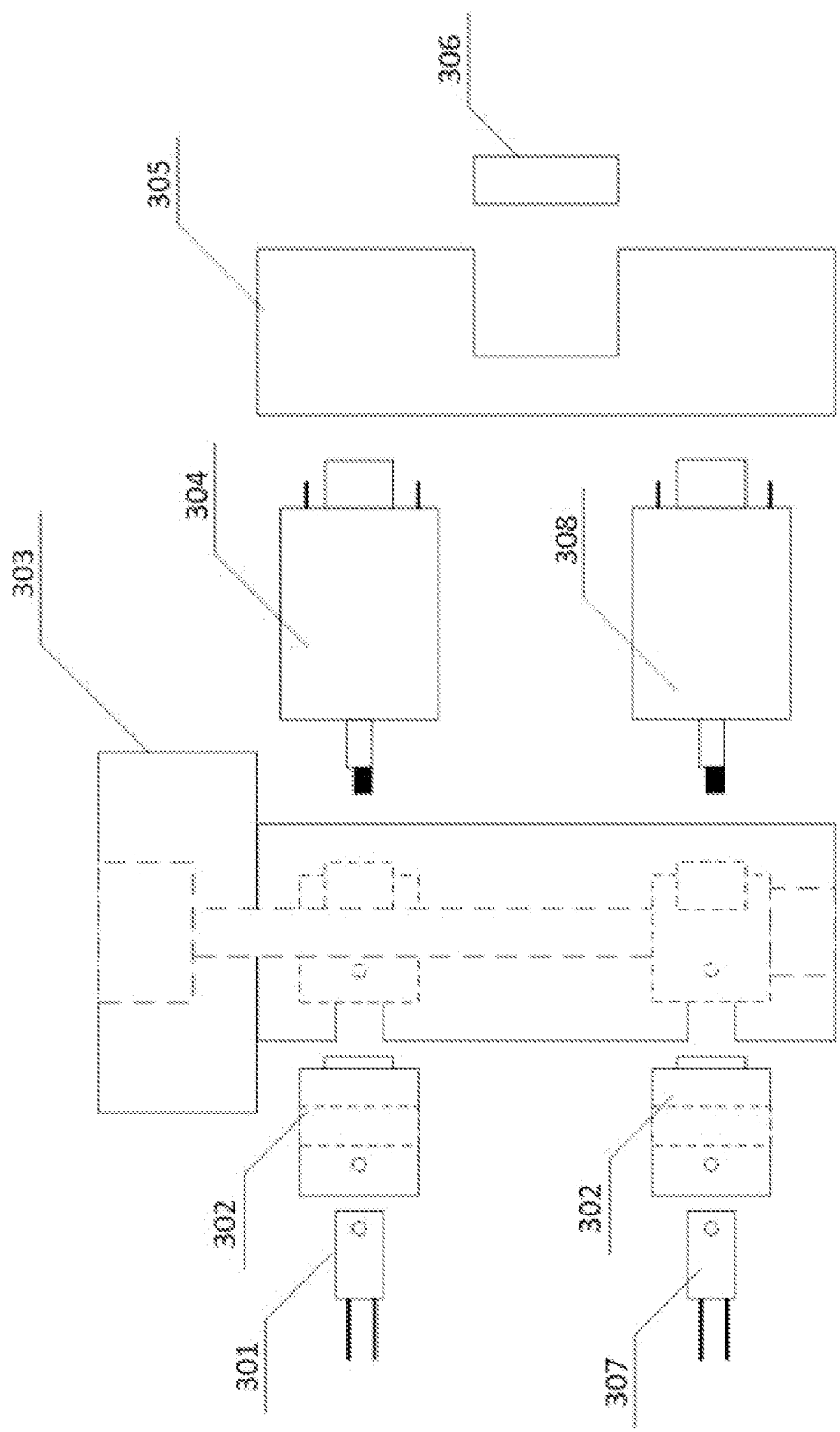
FIG. 12 is an exploded view of the rotary valve according to Embodiment 2 of the present invention.

As shown in FIG. 10, in order to achieve better human-computer interaction, the whole device uses a full-color LED screen with a touch function to display monitoring values such as a temperature of the condensation section and a sensor detection value. The LED screen not only may realize a display function, but also has a touch function, and different instructions may be distributed by clicking corresponding positions on the LED screen. Specifically, when the "collection" option is touched, the device first completes the self-check function, that is, the rotary valve rotates for at least circle, and a rotating position of the rotary valve is determined by the detection mechanism, then the semiconductor chilling places operate, and the type of the exhaled gas is detected through the sensor; after reaching the preset standard, the rotary valve rotates at a preset angle, and the collection is started. When the "blowback" option is touched, the rotary valve rotates until the gas path is smooth, the blowback pump operates and the heating mechanism of the condensation portion operates. According to the actual situation, the device can be adjusted to fast cleaning or high strength cleaning, etc., the cleaning time of the two is different, or the preset blowback time may be set by users.

Figure 13:
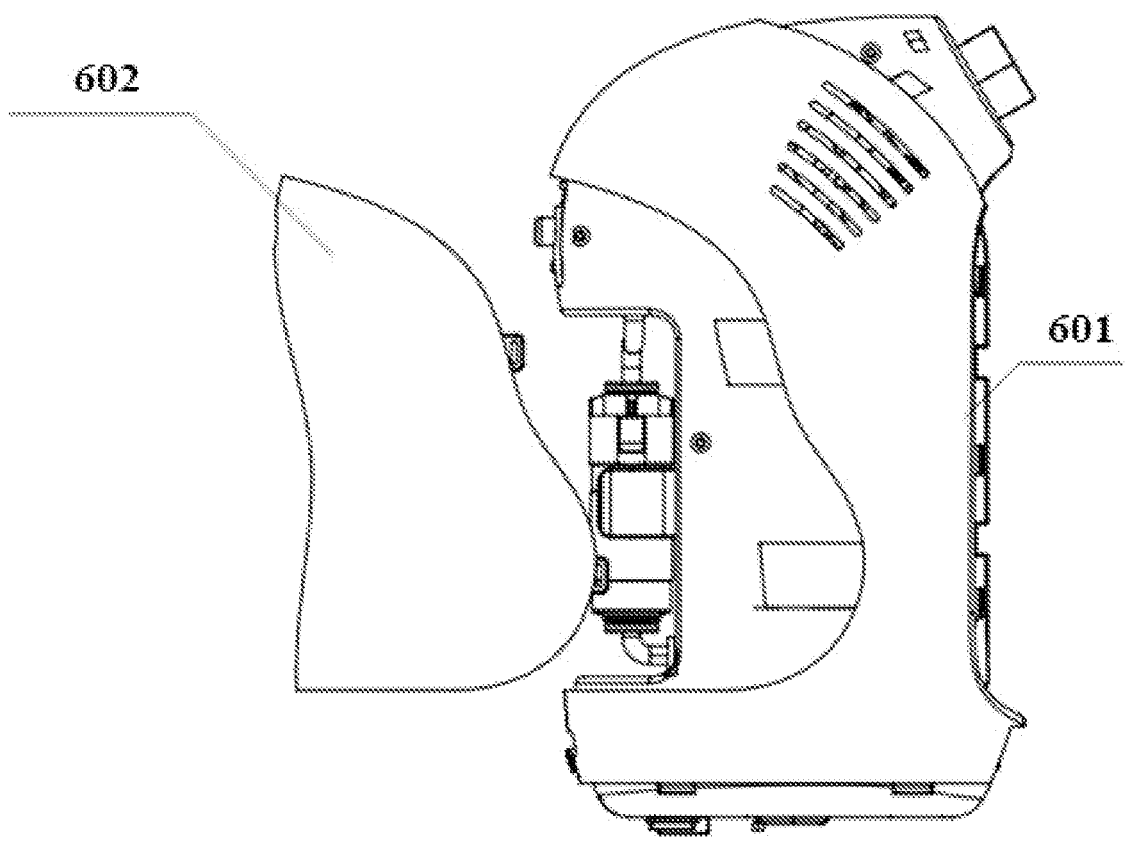
FIG. 13 is a schematic diagram of the main housing of the present invention.

The above device is integrally packaged in the main housing, and a lithium battery for supply power to the electrical components is further provided in the main housing. In this embodiment, the overall portion of the main housing is a streamlined design for easy grasping by human hands, which conforms to the ergonomic principle. The upper end of the main housing is the mouthpiece connection portion, and the caliber is a customized version designed according to the actual use conditions or a general version conforming to the output caliber of most mouthpieces on the market. As shown in FIG. 13, the main housing includes a first housing 601 and a second housing 602. The second housing is detachably connected to the first housing. The back of the first housing is provided with a groove for accommodating the filter. The filter is connected to an output pipe section of the micro air pump through the upper and lower connectors. The first housing is internally provided with a main support frame, and the other stabilization mechanisms above may be the main support frame. The main body portion of the main support frame is configured to carry a circuit board, and a front of the main support frame is configured to carry the display screen. The back of the first housing is further provided with a through hole for connecting an external data line. The built-in main processor is upgradeable. The debugging personnel upgrade the version of the device through a data line jack, so that the product has more functions. The first housing is internally provided with a rechargeable battery, and is also provided with a charging port corresponding to the position of the rechargeable battery. In this embodiment, the standard of the rechargeable battery and charger may refer to the national standard of mobile phone charger.

Both the air pump and the drying air pump of the blowback mechanism may be a 12V brushless motor air pump with a flow rate range of 1000 mL/min to 2000 mL/min. The filter of the blowback mechanism may be a ZFC54 or a ZFC53 of and SMC company, and the filter needs to be replaced after the device has been continuously used for one month. The quick joint female head includes a female head housing which is integrally formed. The female head housing is in threaded connection with an air bag connecting nut 404 of a sampling gas bag or a drying port/charging seat through its external threads. The end of the threaded connection part is a flange part which can touch the push part of the quick joint male head. The upper part of the flange part is an extension part capable of extending into the quick joint male head, and the extension part is provided with a sealing ring. The same spring core is arranged inside the female head housing, which is similar to the principle of the quick joint male head.

The use method of Embodiment 1 of the present invention includes the following steps:

Step 1. Before using the device, firstly, reset the device through the LED screen, that is, the flat side of the first rotary valve is upward, the micro air pump of the blowback mechanism is turned off, and other electrical components are in a standby state;

Step 2. Before the subject is ready for expiration, turn on the sensors and the semiconductor chilling plates;

Step 3. Install the collection container, and the subject exhales into the device after the mouthpiece is installed. Most of the water vapor is removed from the exhaled gas through the condensation section, and under the detection of the $CO_2$ sensor and/or the flow sensor, the exhaled gas is detected as dead space gas or alveolar gas. If the exhaled gas is dead space gas, it flows out of the device along the gas path and the plane of the first steering valve; if the exhaled gas is alveolar gas, the main processor controls the first rotary valve to form a path for gas collection;

Step 4. Remove the gas collection bag after reaching the preset index;

Step 5. Before expiration of the next subject, turn on the micro air pump, make the gas path of the first rotary valve to be longitudinal, and turn on the heating mechanism at the same time to remove residual liquid in the condensation section as soon as possible.

The use method of Embodiment 2 of the present invention includes the following steps:

Step 1. Before using the device, firstly, reset the device through the LED screen, that is, the flat side of the first rotary valve is upward, the air hole of the second rotary valve is in a longitudinal (or transverse) state, the micro air pump of the blowback mechanism is turned off, and other electrical components are in a standby state;

Step 2. Before the subject is ready for expiration, turn on the sensors and the semiconductor chilling plates;

Step 3. The subject exhales into the device after the mouthpiece is installed. Most of the water vapor is removed from the exhaled gas through the condensation section, and under the detection of the $CO_2$ sensor and/or the flow sensor, the exhaled gas is detected as dead space gas or alveolar gas. If the exhaled gas is dead space gas, it flows out of the device along the gas path and the plane of the first steering valve; if the exhaled gas is alveolar gas, the main processor controls the first rotary valve and the second rotary valve to form a path for gas collection;

Step 4. Remove the gas collection bag after reaching the preset index;

Step 5. Before expiration of the next subject, turn on the micro air pump, make the gas path of the first rotary valve to be longitudinal and the gas path of the second rotary valve to be transverse, and turn on the heating mechanism at the same time to remove residual liquid in the condensation section as soon as possible.

According to the solutions disclosed in Embodiments 1 and 2, the selected motor may further be a 5V DC motor or a stepping motor.

In the embodiments, the main processor may be a STM32 embedded low-power chip based on ARM core.

In the above-mentioned steps, there is a plurality of manners for judgment and collection:
a) When the concentration of carbon dioxide is higher than a specified threshold, the rotary valve rotates to achieve exhaled gas collection, and the concentration threshold may be set to be 2%;
b) The flow rate may be collected by integrating time and flow rate by using the flow sensor. The volume of evacuated gas flow is set to be 500 mL to 1000 mL;
c) Dual indexes of the flow rate and the concentration of carbon dioxide are used to determine the rotation of the rotary valve at the same time. That is, if the flow rate is in the range of 3 L/min to 4 L/min and the concentration of carbon dioxide is higher than 2%, the selection of the rotary valve is performed. That is to perform the collection program.

After the collection program is performed, the rotary valve is turned on, and at this time, the exhaled gas will flow into the exhaled gas sampling gas bag through the rotary valve. In step 4, after reaching the preset index, the gas collection bag is removed, and the flow rate may be determined by using the flow sensor. A determination may be made according to the volume of the gas bag. Generally, when the volume of the gas bag is 2 L and the filling volume of the sampling gas bag is 1 L, a preset index is reached.

With the flow sensor, after entering the collection mode, when the gas volume exceeds 1 L, the rotary valve rotates. It is a non-collection mode at this time. The exhaled gas cannot be filled into the gas bag.

At last, it should be stated that the above various embodiments are only used to illustrate the technical solutions of the present invention without limitation; and despite reference to the aforementioned embodiments to make a detailed description of the present invention, those of ordinary skilled in the art should understand: the described technical solutions in above various embodiments may be modified or the part of or all technical features may be equivalently substituted; while these modifications or substitutions do not make the essence of their corresponding technical solutions deviate from the scope of the technical solutions of the embodiments of the present invention.

The invention claimed is:

1. A handheld exhaled gas collection device, comprising a gas access mechanism, a gas detector, a rotary valve, and a gas collection mechanism connected in sequence and forming a gas passage for an exhaled gas, a main processor, and a blowback mechanism,
wherein the gas detector comprises one or more sensors configured to detect one or more parameters of the exhaled gas in the gas passage to transmit data to the main processor, the blowback mechanism comprises an air pump and is configured to introduce an air flow to reversely purge the gas passage, the main processor is configured to control the rotary valve to rotate so as to open and close the gas passage, and the gas access mechanism is configured to filter water vapor in the exhaled gas, and the gas collection mechanism is configured to externally connect a gas collection container to collect the exhaled gas.

2. The handheld exhaled gas collection device according to claim 1, wherein the gas access mechanism comprises a mouthpiece connection portion, a condensation portion and a gas detector connection portion, wherein the mouthpiece connection portion is configured to connect an external mouthpiece, an outer surface of the condensation portion is attached to a semiconductor chilling plate for refrigeration, the semiconductor chilling plate is electrically connected with the main processor, the gas detector is sleeved on the gas detector connection portion, and the gas access mechanism is made of quartz.

3. The handheld exhaled gas collection device according to claim 1, wherein the one or more sensors are selected from a $CO_2$ sensor and a flow sensor.

4. The handheld exhaled gas collection device according to claim 1, wherein:
the rotary valve comprises a rigid main body portion and a valve body rotatable in the main body portion, the main body portion is provided with a longitudinal gas path and a blowback gas path, the blowback gas path is transverse to and in communication with the longitudinal gas path, an end of the longitudinal gas path is connected to the gas collection mechanism,
the valve body comprises a first steering valve,
the gas collection mechanism comprises a connector connected with the gas collection container, and
the first steering valve is disposed between the upper longitudinal gas path and the blowback gas path, a first end of the first steering valve being connected to a first motor and a second end of the first steering valve being provided with a positioning hole extending through the main body portion.

5. The handheld exhaled gas collection device according to claim 4, further comprising a detector disposed in a groove in the main body portion, wherein the detector is configured to emit light under the control of the main processor and to identify a rotation state of the steering valve by detecting a light beam passing the positioning hole.

6. The handheld exhaled gas collection device according to claim 4, wherein a motor support frame is disposed outside the valve body and the motor, and is fixedly connected with the main body portion, an outer diameter of a rotating shaft matches an inner diameter of a slotted hole of the valve body, and a material of the rotary valve body is the same as or different from that of the main body portion.

7. The handheld exhaled gas collection device according to claim 1, wherein:
the rotary valve comprises a rigid main body portion and a valve body rotatable in the main body portion, the main body portion is provided with a longitudinal gas path and a blowback gas path, the blowback gas path is transverse to and in communication with the longitudinal gas path, an end of the longitudinal gas path is connected to the gas collection mechanism,
the valve body comprises a first steering valve and a second steering valve, the first steering valve being disposed between the upper longitudinal gas path and the blowback gas path, the second steering valve being disposed between the blowback gas path and the lower longitudinal gas path,
a first end of the first steering valve is connected to a first motor and a second end of the first steering valve is provided with a positioning hole passing through the main body portion, and
a first end of the second steering valve is connected to a second motor and a second end of the second steering valve is provided with a positioning hole passing through the main body portion, and a main body of the second steering valve is in shape of a cylinder.

8. The handheld exhaled gas collection device according to claim 1, wherein a gas outlet of the air pump is connected with the blowback gas path, and a filter is further arranged therebetween for purifying air.

9. The handheld exhaled gas collection device according to claim 8, wherein the gas passage, the rotary valve, the sensors, the main processor and the blowback mechanism are packaged in a main housing, the main housing comprises a first housing and a second housing, the second housing is detachably connected to the first housing, a back of the first housing is provided with a groove that received the filter, the filter is connected to an output pipe section of the micro air pump through upper and lower connectors, the first housing is internally provided with a main support frame, a main body part of the main support frame is configured to carry a circuit board, a front of the main support frame is configured to carry a display screen, a back of the first housing is further provided with a through hole for connecting an external data line, the first housing is internally provided with a rechargeable battery, and is also provided with a charging port corresponding to the position of the rechargeable battery.

* * * * *